United States Patent [19]
Ghering

[11] Patent Number: 5,155,827
[45] Date of Patent: Oct. 13, 1992

[54] METHOD FOR INHIBITING AN EXECUTABLE PROGRAM IN A DISK OPERATING SYSTEM BY REPLACING THE PROGRAM WITH AN UNEXECUTABLE PROGRAM

[76] Inventor: Boyd W. Ghering, 551 Maple Ave., Doylestown, Pa. 18901

[21] Appl. No.: 325,289

[22] Filed: Mar. 17, 1989

[51] Int. Cl.5 .......................................... G06F 13/14
[52] U.S. Cl. .............................. 395/425; 364/286.5; 364/286.4; 364/286; 364/284; 364/DIG. 1; 395/700
[58] Field of Search ... 364/200 MS File, 900 MS File; 395/425, 700

[56] References Cited

U.S. PATENT DOCUMENTS

| | | | |
|---|---|---|---|
| 4,757,533 | 7/1988 | Allen | 380/25 |
| 4,975,898 | 12/1990 | Yoshida | 360/60 |
| 4,980,782 | 12/1990 | Ginkel | 360/60 |

OTHER PUBLICATIONS

Disk Optimizer, by Softlogic Solutions 1985, Manchester, N.H.
Paul Somerson, "PC Magazine DOS Power Tools"; Bantam Books, Inc. New York, 1988, pp. 875-876, 892-894, 1017-1019, 1036-1038, 1131 and 1134-1135.

Primary Examiner—Thomas C. Lee
Assistant Examiner—Eric Coleman
Attorney, Agent, or Firm—Howson and Howson

[57] ABSTRACT

A computer program, comprising a series of batch processes filed on a separte distribution disk, inhibits an executable program in a disk operating system (DOS). In one embodiment, the batch file of a process, unconditionally ineffective for replicating the functions of the executable program, is transferred from a distribution disk to the computer's DOS and renamed with the filename of the executable program but with an externally executable extension. The DOS file of the executable program is transferred to the distribution disk and renamed with an externally unexecutable extension. In another embodiment, the batch file of the process is conditionally ineffective for replicating the executable program. The user is required to elect, to the exclusion of at least one designated drive in the computer, a drive on which the executable program can be executed.

8 Claims, 10 Drawing Sheets

METHOD FOR INHIBITING AN EXECUTABLE PROGRAM IN A DISK OPERATING SYSTEM BY REPLACING THE PROGRAM WITH AN UNEXECUTABLE PROGRAM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to computer software for use with a disk operating system, and more particularly to a program for inhibiting use of executable programs in a disk operating system.

Executable programs are programs in the disk operating system (DOS) loaded in a computer and are initiated with external commands by the computer operator. In Microsoft ™ or IBM ™ DOS, these programs are identified by discrete filenames with extensions COM, EXE and BAT. Programs with extensions COM and EXE, take precedence in execution over the same filename with a BAT extension. Two such programs are FORMAT.COM or FORMAT.EXE for initializing a new, unused disk, and DISKCOPY.COM or DISKCOPY.EXE for copying everything from one disk to another.

There are times, however, when it is desired to prevent such executable programs from being used. For instance, before a new or blank floppy or disk can receive and store information in binary form, it must be initialized or formatted with special markers so that when an executive or operating system reads or writes a file to the disk, it will know on which sector and track the file is written. Formatting also sets up directories containing file location information and checks the disk for defects. Once the disk is formatted, information can be stored on it as often as desired without reformatting. To prevent a user from writing over previously recorded information, the sleeve which contains the floppy or disk usually has a small rectangular notch or window on one side. If the notch or window is covered when inserted in a disk drive, the computer prevents information from being written on the disks. Most master distribution disk for software products have no notch and are therefore permanently write-protected. However, write-protection will not protect against formatting. Formatting will permanently wipe off the entire contents of any previously created operating systems and recorded information on the disk. Therefore, a user must always be consciously aware of the consequences of formatting any disk media, particularly a fixed disk, and be absolutely certain it contains no files which need to be retained.

While the consequences of accidentally or maliciously executing a formatting program are especially severe, other programs are similarly vulnerable. For instance, there is no means within a DOS for preventing a user from executing the external command DISKCOPY and making an unauthorized copy of confidential information recorded on another disk such as the fixed or hard disk of a computer.

SUMMARY OF THE INVENTION

Accordingly, it is an object of the present invention to provide a method for inhibiting use of an executable computer program recorded in memory.

Another object is to provide a method for limiting access to executable programs recorded on a disk operating system of a computer.

Still another object is to provide a method for temporarily removing an executable program file from a disk operating system.

A further object is to provide a method for preventing accidental or malicious destruction of information stored in a computer system.

Another object is to provide a method for preventing reproduction of confidential or proprietary programs and other recorded information on other disks.

A still further object is to provide a computer program which is stored on a separate disk for controlling the use of executable programs, which can be kept under supervisory custody and control, which can be used on only one computer at a time, and which is easy and economical to use.

Briefly, these objects and other aspects of the invention are carried out by a computer program comprising a series of executable batch processes filed on a separate software product, hereinafter referred to as a distribution disk. One of the processes, which is unconditionally ineffective for performing the functions of a specified executable program, is substituted for the executable program in the computer's disk operating system. With the distribution disk placed in an external drive selected as default, the user enters an external command INSTALL, and the substitute process file on the distribution disk and the executable program file in the computer's DOS are interchanged. The substitute file is renamed in the DOS with the same filename as the executable program but with a .BAT extension, and the distribution disk is removed from the computer. If the user now attempts, accidentally or intentionally, to initiate the program in the executable file, the ineffective substitute process is executed instead. The substitute process file can be removed by reinserting the distribution disk back into the default drive and executing an external command REMOVE. A batch routine then proceeds to find the substitute process file in the DOS and exchanges it for the executable file which was temporarily taken from the computer and stored in the distribution disk.

In an alternate method according to the invention, the substitute process is conditionally ineffective for operating an executable DOS program in a computer having multiple drives. The substitute process requires the user to choose, to the exclusion of at least one designated drive, a drive on which the executable DOS program can be carried out.

BRIEF DESCRIPTION OF THE DRAWINGS

For a better understanding of these and other objects and aspects of the invention, reference is made to the following more detailed description taken in conjunction with the accompanying drawings wherein.

DETAILED DESCRIPTION OF THE PREFERRED EMBODIMENTS

Although the invention is applicable to any executable program initiated by an external command, one of its most useful applications is for the prevention or inhibition of formatting of floppy disks, diskettes or the hard disk in a computer. For this reason, the invention will be related to this application, but of course it is equally applicable to other executable programs.

Figure 1:
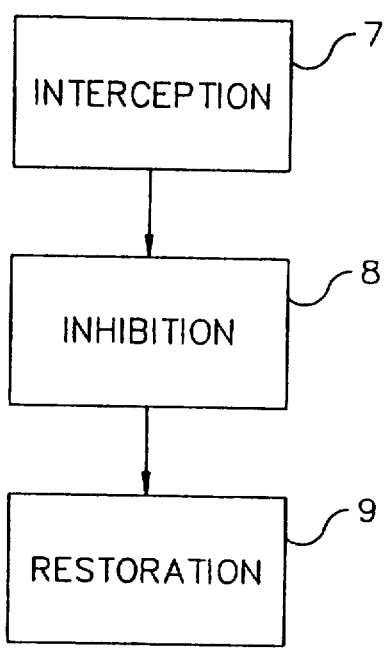
FIG. 1 is a generalized flow chart of a computer program according to the invention for inhibiting the formatting of a disk.

The program for inhibiting formatting of disk media according to the invention is primarily implemented by a general purpose digital computer serving as the host and executed in accordance with internal and external DOS commands such as IBM TM PC-DOS, Version 3.30. Referring now to FIG. 1, the complete inhibiting program consists of three processes, interception 7, inhibition 8, and restoration 9, executed in the order illustrated by interaction of the user when external commands INSTALL, FORMAT and REMOVE, respectively, are entered into the computer. The processes are carried out by a series of batch files stored on an external distribution disk. When called, these files are loaded into the computer primary memory and executed. The interception process 7 substitutes a file containing the inhibition process 8 on the distribution disk, which is ineffective for formatting, for the file containing the formatting program in the DOS of the computer; and, at the user's command, completely restores the formatting program file to the DOS with the inhibition process file returned to the distribution disk.

Figure 2:
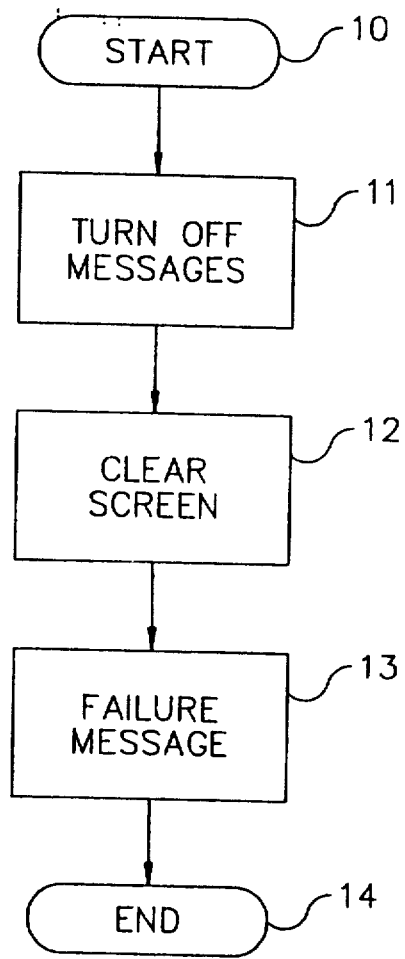
FIG. 2 is a flow chart of one embodiment of an inhibition process in the computer program of FIG. 1 for unconditionally preventing formatting a disk.

The embodiment of the inhibition process 8 in FIG. 2, stored on an external distribution disk, such as a 3.5 inch diskette, under a filename TRANSFER.EXE, is started when the file is on the command path and the command FORMAT is entered at block 10. Appendix A hereto is a source code listing in PC-DOS commands of the routines for implementing the unconditional inhibiting program in a computer, such as an IBM TM PS/2 Model 30 or functional equivalent, having an external drive A: and a fixed or hard drive C:. However, as will become apparent hereinafter, the program is also applicable to computers having multiple external drives, e.g. A: and B:. Block 11 turns off all messages, block 12 clears the CRT screen, and block 13 displays a "failure" message (FORMAT PROTECTION MUST BE REMOVED IN ORDER TO FORMAT DISK MEDIA), and the process ends at block 14. Process 8, however, is not operational until it is installed in the computer in place of the DOS formatting process. To install process 8, an external disk drive, appropriate for the distribution disk on which the substitute inhibition program file is recorded and designated TRANSFER.EXE, is selected as the default drive. In the illustrated embodiment the computer has a 3.5 inch disk drive A: and the DOS is installed on the fixed disk drive C: within either the root directory or DOS subdirectory. The distribution disk is inserted in drive A:, and designated default by typing "A:" and pressing the RETURN or ENTER key. When the "A:>" prompt appears on the screen, the file for the inhibiting process 8 is ready to be installed.

Figure 3A:
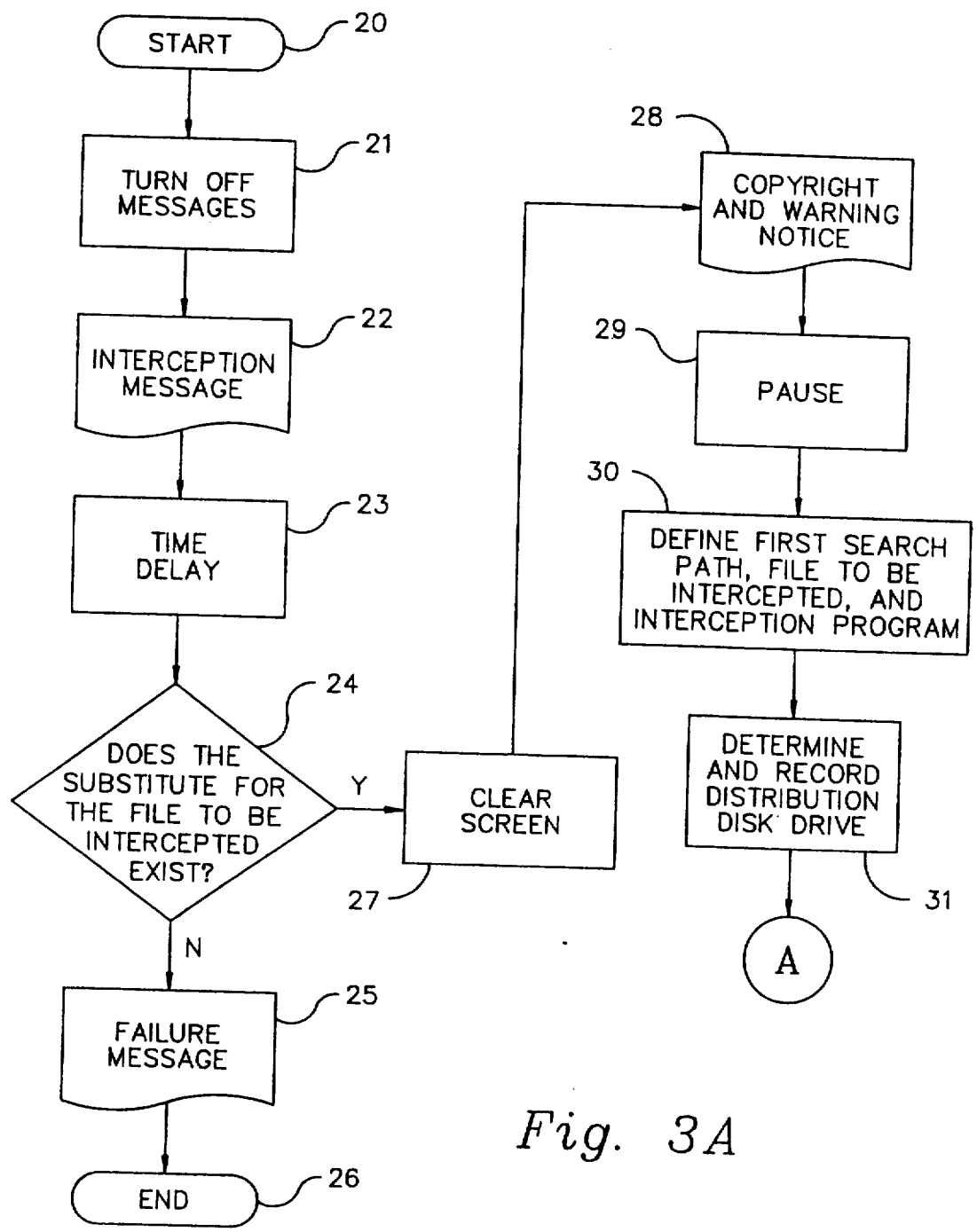
FIGS. 3A and 3B are flow charts of an interception process for the inhibition process of FIG. 2.

Referring now to FIG. 3A, the user starts the interception process 7 at block 20 with the external command INSTALL. Block 21 turns off all messages, and block 22 provides an interception message (INSTALL PROGRAM IN OPERATION—PLEASE WAIT) indicating interception is in process. Block 23 provides a time delay for the user to read the message. A routine for executing the time delay is disclosed at page 1134, PC Magazine DOS Power Tools, Paul Somerson, Executive Editor, PC Magazine; Bantam Books, Inc. 1988. Block 24 automatically checks whether the file for the substitute inhibition process 8 with the filename TRANSFER.EXE is on the distribution disk. If it does not exist, it would indicate that the file has already been transferred to the fixed disk, and block 25 would present a "failure" message (FORMAT PROTECTION ALREADY INSTALLED), and the program would end at block 26. If the TRANSFER.EXE file is found in the distribution disk, block 27 clears the screen of all messages, and block 28 may display any copyright and warning notices, and a message (PRESS CTRL-C TO ABORT—ANY OTHER KEY TO CONTINUE) offering the user the option to continue or stop the program. Block 29 suspends the program until a choice is made. To stop the program, the DOS command (CTRL-C or CTRL-BREAK) is entered. If the user presses any key to proceed with interception, block 30 defines all the file paths (FORMAT.COM and FORMAT.EXE) which are to be searched in the fixed disk's root directory (C: ) and DOS subdirectory (C: DOS ), and the installing routines to be used in the interception process 7.

If there are two external drives A: and B: in the computer, block 31 would determine and record, by a FLOPPY.COM routine, Appendix B, the drive in which the distribution disk had been placed. Block 32, FIG. 3B, prevents the inhibition process 8 from being installed from the hard or fixed drive. In this event, block 32a displays a "failure" message (NO EXTERNAL DRIVE SELECTED—PROGRAM ABORTED), and the process ends.

A batch loop subroutine, executed in block 33 by a conventional loop program such as disclosed at page 1036, PC Magazine DOS Power Tools, supra, checks at block 34 whether or not the executable file (FORMAT) is in one of the search paths defined in block 30. If not found, block 35 redefines the search path for the next search and block 36 determines if the search is completed. If not completed, block 36 recycles the search to block 34. If there are no more search paths, block 37 presents a "failure" message (CANNOT LOCATE FORMAT PROGRAM, INSTALLATION OF FORMAT PROTECTION ABORTED), block 38 sets the drive determined in block 21 back to the original distribution disk drive, and the program ends.

Figure 4:
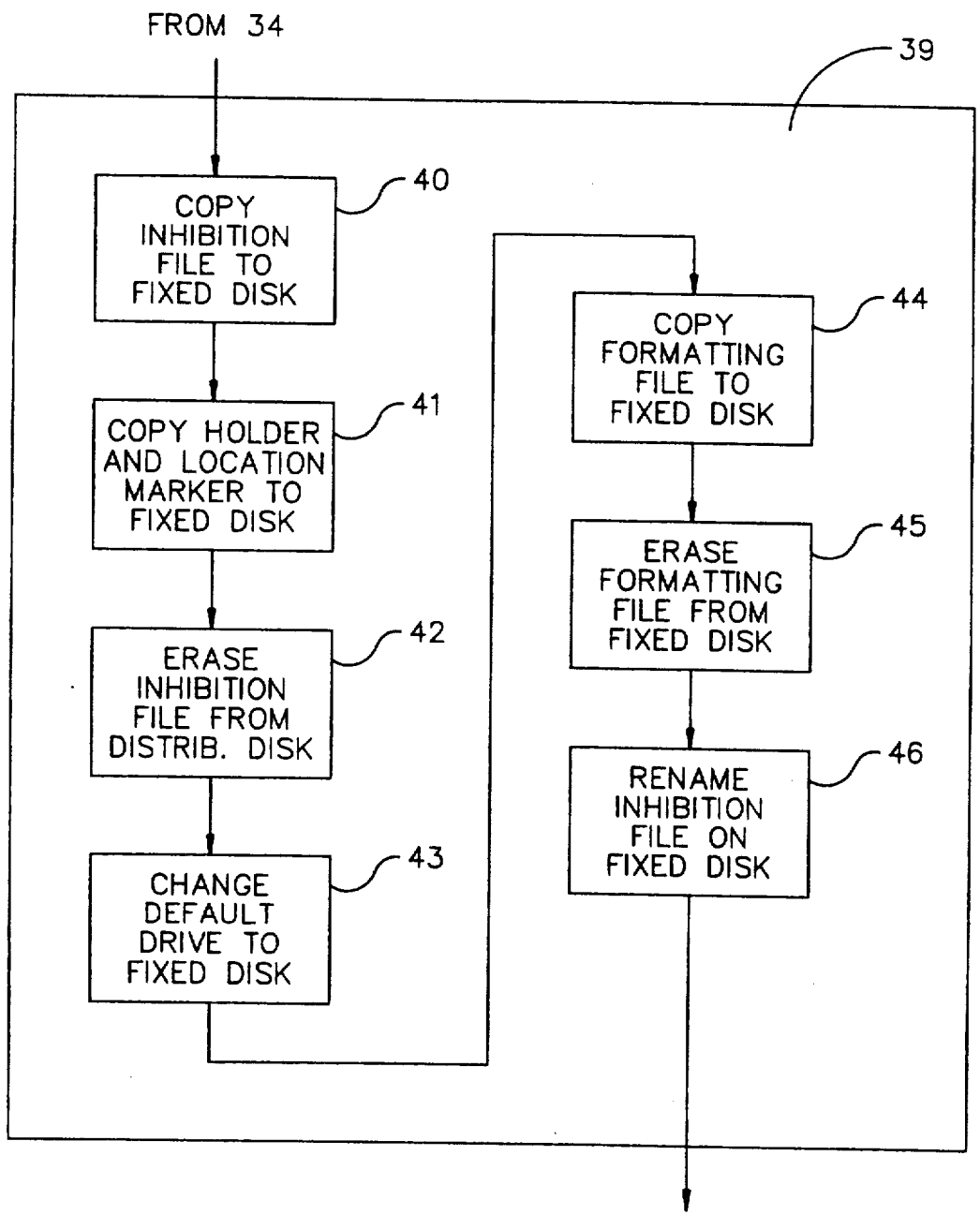
FIG. 4 is a flow chart of a routine in the interception process of FIG. 3B for installing the inhibition process of FIG. 2.

If the program is found in a selected search path, block 39 executes an install routine. Referring to FIG. 4, block 40 copies the file of the substitute inhibition process 8 (TRANSFER.EXE) from the distribution disk to the fixed disk, and block 41 copies a location marker PLACE.XXX in the DOS directory and renames it as an executable file PLACE.COM or PLACE.EXE, as appropriate. This will inform the computer during the restoration process 9 where to replace the DOS formatting file on the fixed disk. Block 42 erases the file of the inhibition process 8 from the distribution disk, and block 43 changes the default from drive A: to drive C:. Blocks 44 and 45, respectively, transfers the DOS formatting file (FORMAT.COM or FORMAT.EXE) on the fixed disk to the distribution disk and renames it FORMAT.XXX, and block 46 renames the inhibition process 8 from TRANSFER.EXE to FORMAT.BAT.

This completes installation of the inhibition process 8. Therefore, block 47 presents a message to that effect (FORMAT PROTECTION INSTALLED—FORMAT COMMAND LOCKED), and block 48, like block 38, sets the drive back to the original installation drive. As described above, when a user enters the command FORMAT, the substitute process is executed, which is ineffective for formatting, and displays the "failure" message of block 13 (FIG. 2).

Figure 5A:
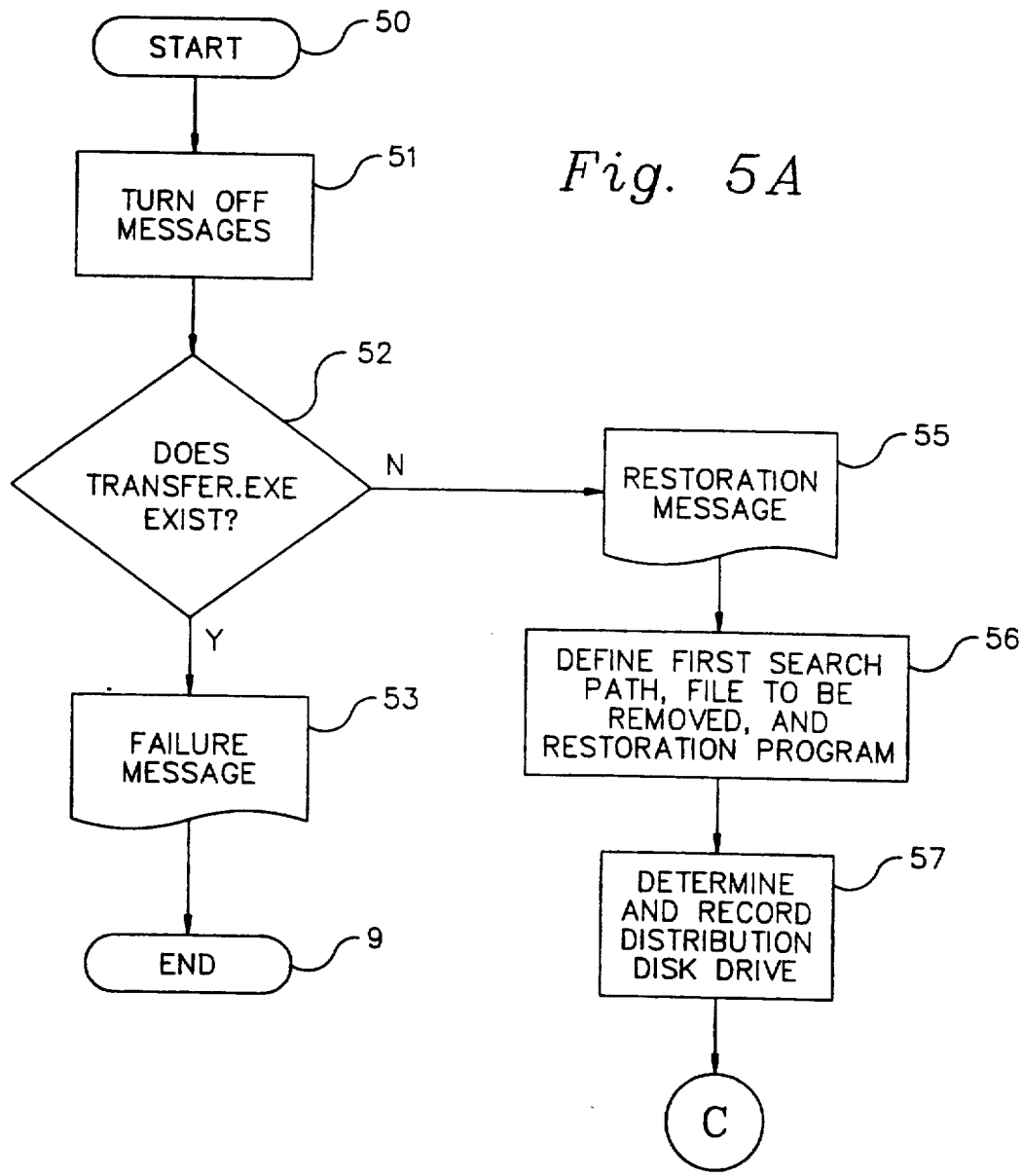
FIGS. 5A and 5B are flow charts of a restoration process for the inhibition process of FIG. 2.
Figure 5B:
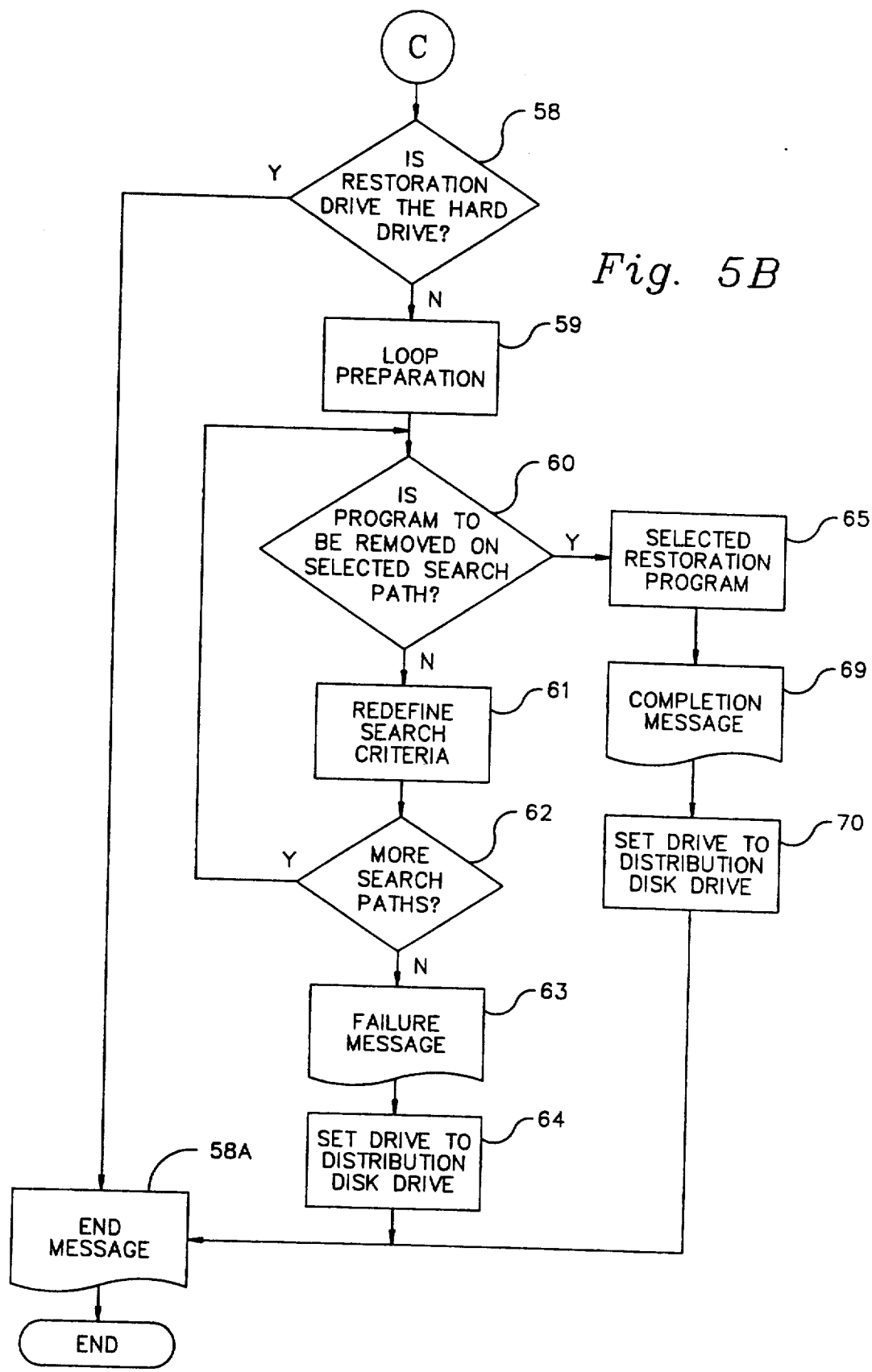

The restoration process 9 is essentially the reverse of the interception process 7. The file for the inhibition process 8 with the filename FORMAT.BAT is returned to the distribution disk, and the DOS formatting program with the filename FORMAT.XXX is returned to the DOS directory with the extension changed back to a .COM or .EXE. In order to restore the DOS formatting program file to the computer, it is necessary to re-insert the distribution disk in an external drive and execute restoration process 9. Referring to FIG. 5A, the process is started at block 50 with the external command REMOVE. Block 51 turns off all messages from the batch file program, and block 52 automatically determines whether the inhibition process 8 file TRANSFER.EXE is on the distribution disk. If present, that would indicate the inhibition process 8 had not been installed and block 53 would present a "failure" message (FORMAT PROTECTION NOT INSTALLED—PROGRAM ABORTED) and the program ends. On the other hand, if the inhibition process 8 file is not found on the distribution disk, block 55 presents a restoration message (FORMAT PROTECTION REMOVAL IN PROGRESS—PLEASE WAIT). Block 56 then defines the search paths and files for the place marker (PLACE.COM or PLACE.EXE) in the fixed disk's root directory or DOS subdirectory. In the event there are two external drives, block 57 determines and records, by the routine FLOPPY.COM, Appendix B, the drive in which the distribution disk has been placed, and block 58 determines whether or not restoration process 9 is in the fixed drive. If it is, the restoration process 9 is ended with a message at block 58a (NO EXTERNAL DRIVE SELECTED—PROGRAM ABORTED). If the place marker is not on the fixed drive, block 59 executes a batch loop routine, such as disclosed at page 1036, PC Magazine DOS Power Tools, supra, in search of one of the paths (C: PLACE:-COM) defined in block 56. As the search proceeds, block 60 determines whether or not the program to be removed was found on search. If not, block 61 redefines the search criteria and block 62 causes the search to repeat for another defined path and file. If no file is found, block 63 displays a "failure" message (CANNOT LOCATE FORMAT PROGRAM—REMOVAL OF FORMAT PROTECTION ABORTED). The drive is then set at block 64 to the original distribution disk drive and the program ends.

Figure 6:
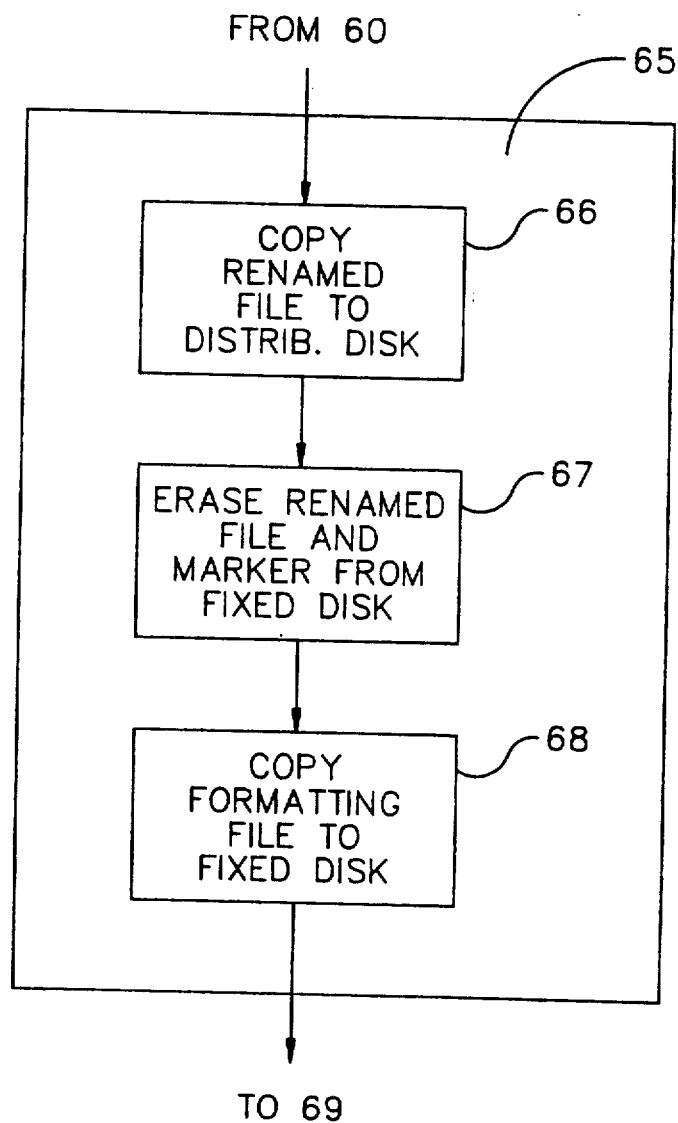
FIG. 6 is a flow chart of a routine in the restoration process of FIG. 5B for removing the inhibition process of FIG. 2.

If block 60 indicates the file (PLACE.COM or PLACE.EXE) is in one of the selected search paths, block 65 executes the removal routine. Referring to FIG. 6, block 66 copies the inhibition process 8 file (FORMAT.BAT) from the fixed disk to the distribution disk and restores its original name TRANSFER.EXE. Block 67 erases the FORMAT.BAT and the PLACE.-COM or PLACE.EXE files from the fixed disk, and block 68 copies the DOS formatting program file (FORMAT.XXX) from the distribution disk to the fixed disk and restores its original name FORMAT.-COM or FORMAT.EXE. When completed, block 69 presents a completion message (FORMAT PROTECTION REMOVED), and block 70 sets the drive back to the original restoration drive, and the program ends. With the format protection now removed, the distribution disk may also be removed, and the DOS formatting capability is completely restored in the computer.

Figure 7:
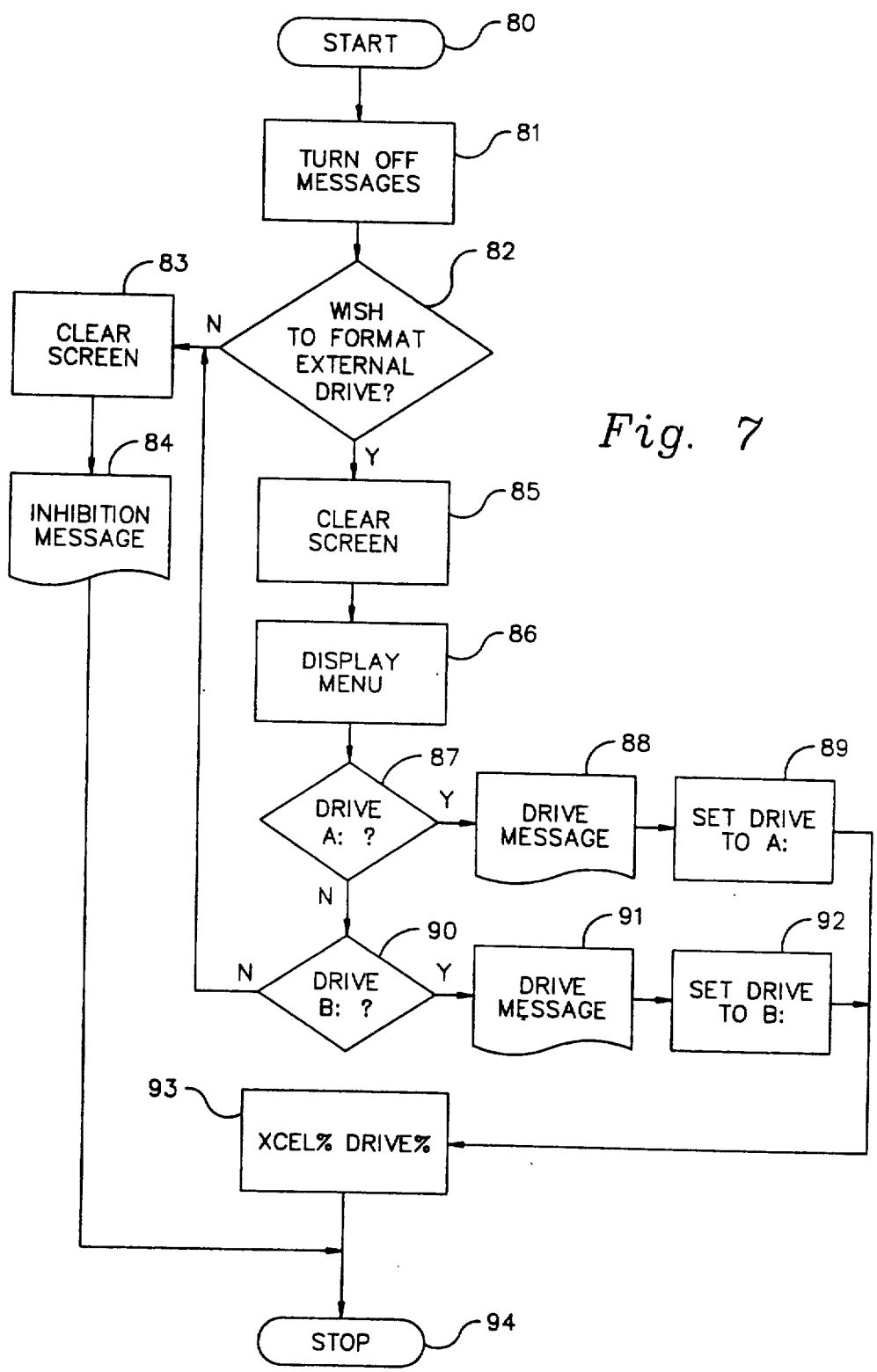
FIG. 7 is a flow chart of another embodiment of an inhibition process in the computer program of FIG. 1 for conditionally preventing formatting of a disk.

The above-described inhibition process, is referred to as being unconditional because the inhibited DOS programs cannot be executed under any conditions. However, the inhibition process may take another form, referred to as conditional inhibition, in which the user may execute inhibited programs under certain conditions. For example, external DOS commands on a designated disk drive of the computer may be used, but not on other drives. Appendix C hereto is a source code listing in PC-DOS commands of the routines for implementing the conditional inhibiting program in a conventional computer having two external drives A: and B:, and a fixed or hard drive C:. Referring to the illustrated embodiment of FIG. 7 the inhibition process will permit a disk on either external drive A: or B: to be formatted, but not the fixed disk of drive C:. The process starts at block 80 when the inhibition program TRANSFER.EXE is on the command path and the command FORMAT entered. Block 81 turns off all messages, and block 82 implements an ASK routine, as disclosed at page 892, PC Magazine DOS Power Tools, supra. This routine presents a message (WISH TO FORMAT EXTERNAL DRIVE (Y/N)? ). If the user enters N for "no", block 83 clears the screen and block 84 displays the unconditional inhibition message (FORMAT PROTECTION MUST BE REMOVED IN ORDER TO FORMAT HARD DISK MEDIA), and the program ends at block 94. If the user answers Y for "yes", block 85 clears the screen and block 86 displays a menu (1—FORMAT DRIVE A:, 2—FORMAT DRIVE B:, 3—QUIT). If drive A is selected at block 87, block 88 displays a message (DRIVE A HAS BEEN SELECTED) and block 89 sets the default drive to A: by batch commands; and if drive B is selected at block 90, block 91 displays the selection message (DRIVE B HAS BEEN SELECTED) and block 92 sets the default drive to B:. If the user enters QUIT, the inhibition message of block 84 is displayed and the process ends at block 94. If either drive A: or drive B: is set at default, the disk is formatted by the command XCEL % DRIVE % since the original format command has been renamed, as described below, to XCEL in the distribution disk, and the process ends at block 94.

Figure 3B:
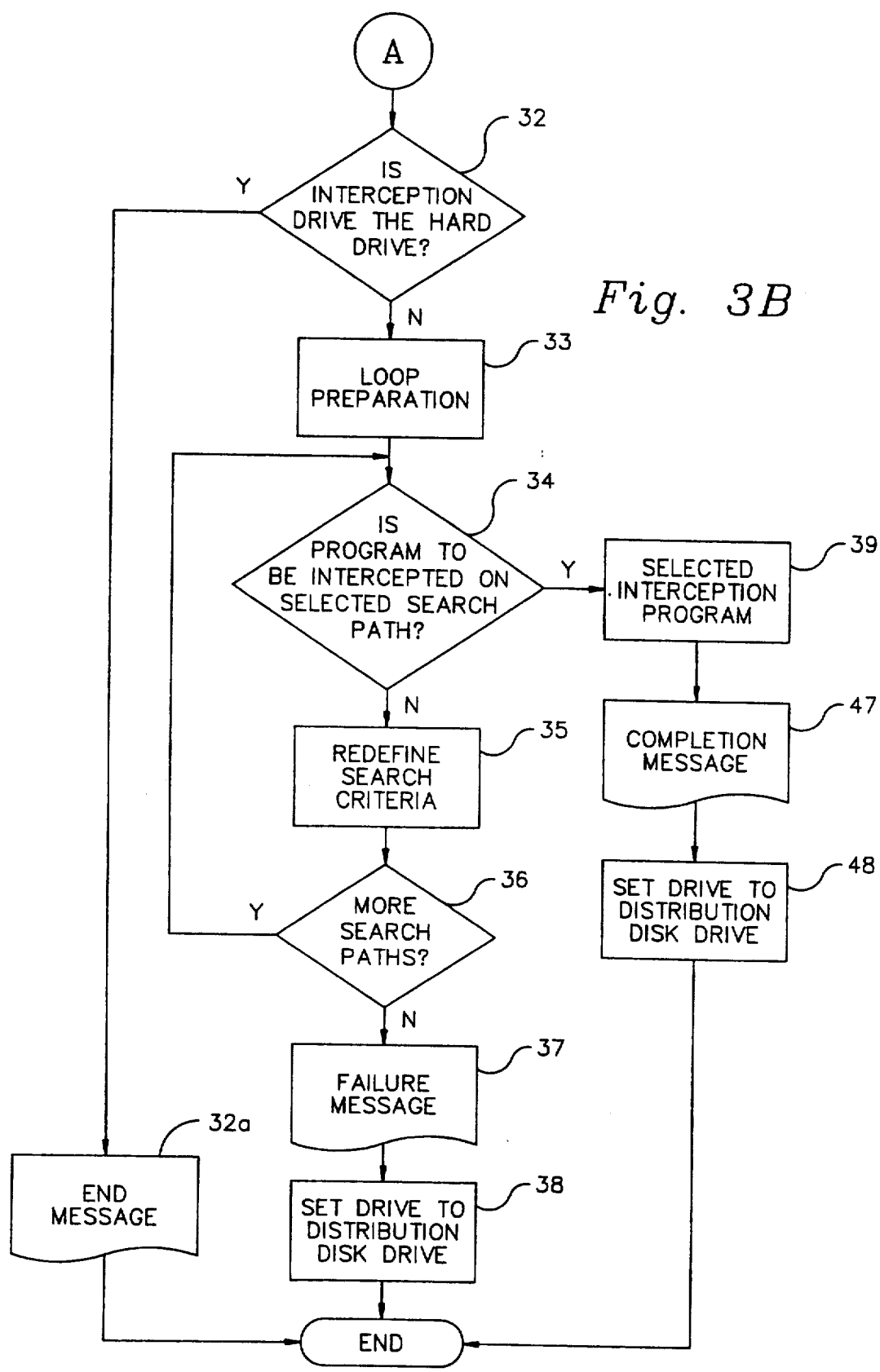
Figure 8:
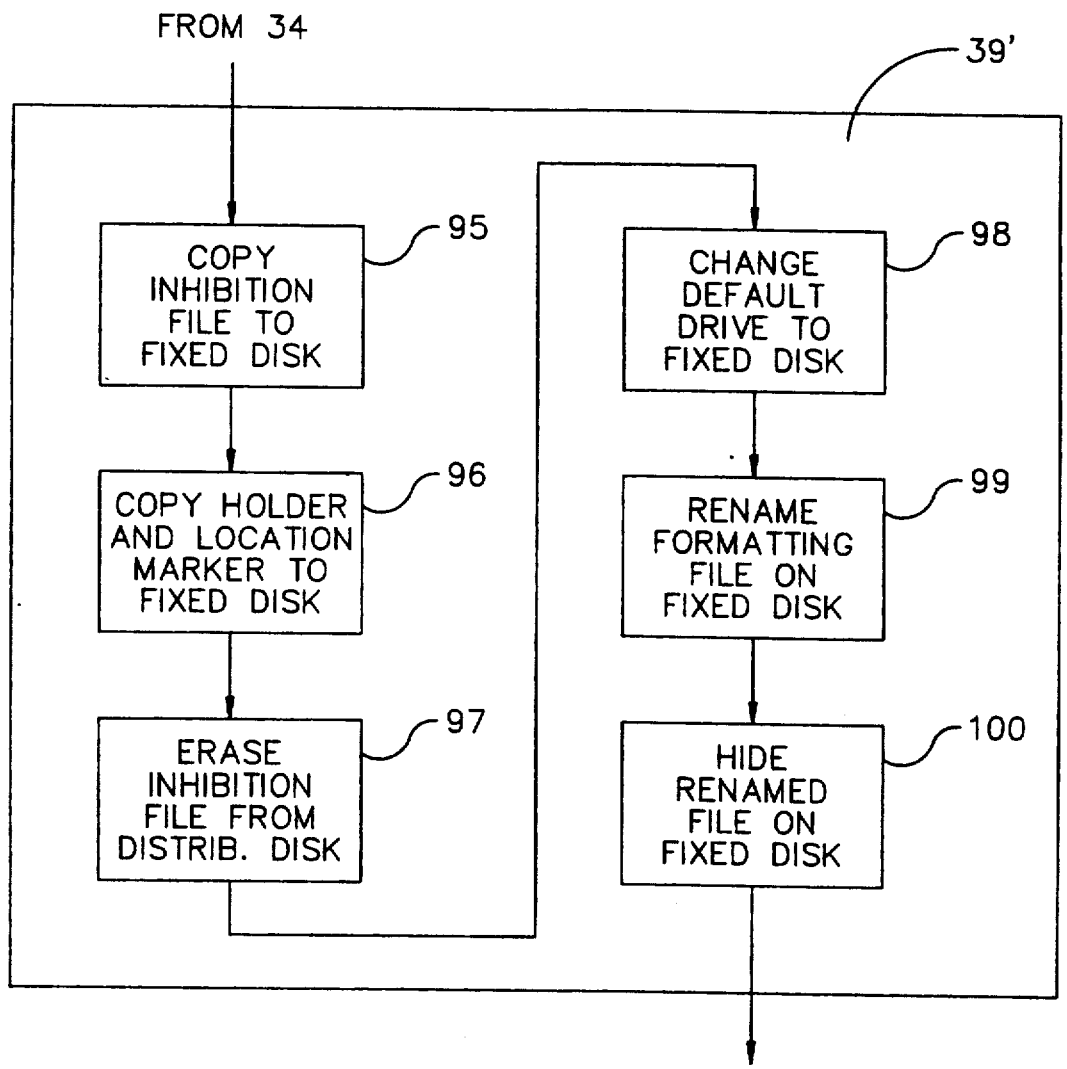
FIG. 8 is a flow chart of a routine in the interception process of FIG. 3B for installing the inhibition process of FIG. 7.

Like the unconditional inhibition, conditional inhibition is not operational until it is installed in the computer. The interception process of FIGS. 3A and 3B is the same as for unconditional inhibition except that the install routine of block 39 (FIG. 3B) is replaced by block 39' of FIG. 8. Block 39' includes a block 95 which copies the substitute inhibition process 8 file (TRANSFER.EXE) and routine ASK.COM, such as disclosed at page 892, PC Magazine DOS Power Tools, supra: and block 96 copies a location marker file PLACE.XXX in the DOS directory and renames it as an executable file PLACE.COM or PLACE.EXE, as appropriate. This informs the computer during the restoration process 9, described below, where to replace the DOS formatting file on the fixed disk. Block 97 erases the inhibition process 8 file from the distribution disk, and block 98 changes the default from external drive A: or B: to drive C:. Block 99 renames the DOS formatting file FORMAT.COM to XCEL.COM and the inhibition file TRANSFER.EXE to FORMAT.BAT; and block 100 renders the renamed formatting file XCEL.COM hidden by means of a HIDE routine, such as disclosed in Samerson et al, supra. page 1017.

This completes installation of the conditional inhibition process. Block 47 (FIG. 3B) presents a message to that effect and the process ends.

Figure 9:
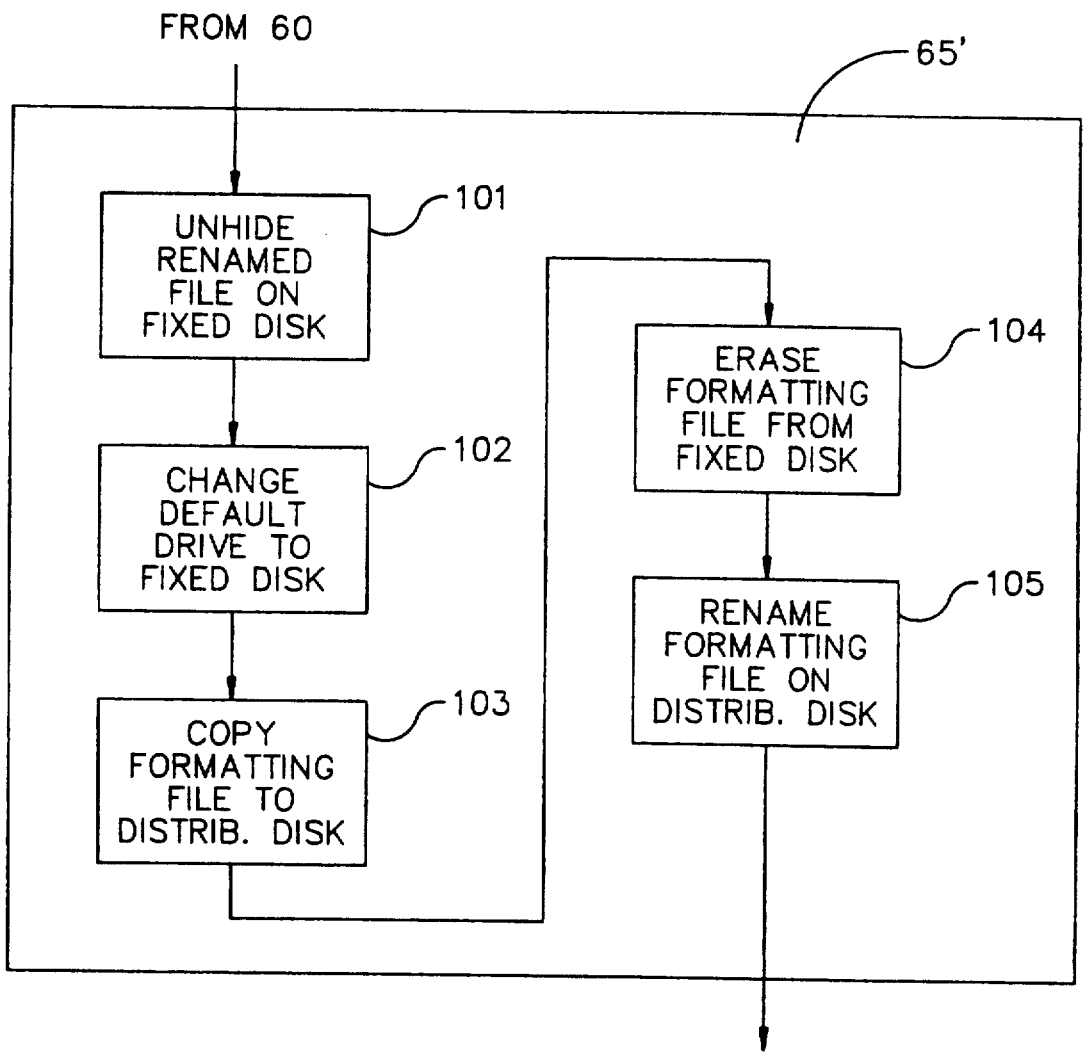
FIG. 9 is a flow chart of a routine in the restoration process of FIG. 5B for removing the inhibition process of FIG. 7.

The restoration process for conditional inhibition is essentially the same as for unconditional inhibition except that removal routine 65 is replaced by routine 65'. Referring to FIG. 9, block 65' includes a block 101 which executes a routine UNHIDE, such as disclosed in Samerson et al, supra, page 1131, which brings the hidden renamed file XCEL.COM into view. Block 102 changes the default drive to the fixed disk, and block 103 copies the inhibiting file named FORMAT.BAT to the appropriate drive with the filename TRANSFER.EXE. Block 104 erases the file FORMAT.BAT from the fixed disk, and block 105 renames the formatting file from XCEL.COM to FORMAT.COM. This completes the removal routine. Block 69 presents a completion message, and the process is ended with the message at block 58A. As in the unconditional inhibition process, format protection has been removed and the DOS formatting capability completely restored.

Some of the many advantages of the invention should now be readily apparent. For example, a computer program is provided which inhibits the use of executable programs in a disk operating system recorded in a computer. The executable program may be removed from the DOS and placed on a separate removable disk for security purposes. The program is particularly suited for preventing accidental or malicious formatting of disks containing valuable programs or recorded information which would otherwise be destroyed during the formatting process. The program is extremely simple to install and remove without affecting the integrity of other DOS programs and files.

It will be understood, of course, that the above-described embodiments are only illustrative of the application of the principles of the present invention. Modifications in these embodiments may be devised by those skilled in the art without departing from the principle and scope of the invention.

APPENDIX A

UNCONDITIONAL INHIBITION

```
DIR

Volume in drive A has no label
Directory of  A:\

LOOP      COM       69    6-01-88   12:00p
READ      ME      2956    1-21-89    3:48p
PLACE     XXX      128    2-09-89    8:45a
FORMAT    XXX     9390    1-24-86   12:00p
TRANSFER  EXE      256    2-08-89    1:29p
ICOND1    BAT      384    2-08-89    9:35p
INSTALL   BAT     1408    2-08-89    1:14p
ICOND2    BAT      384    2-08-89    9:35p
ICOND3    BAT      384    2-08-89    9:35p
ICOND4    BAT      384    2-08-89    9:36p
RCOND1    BAT      256    2-08-89    9:36p
INS       BAT      512    2-08-89    1:19p
FLOPPY    COM       18   12-07-88    9:37p
WAIT      COM      121    6-01-88   12:00p
RSTART    BAT      256    2-08-89    1:32p
RCOND2    BAT      256    2-08-89    9:37p
RCOND3    BAT      256    2-08-89    9:37p
RCOND4    BAT      256    2-08-89    9:37p
REMOVE    BAT      256    2-08-89    1:30p
ISTART    BAT      256    2-08-89    1:31p
REC       BAT      512    2-08-89    1:34p
       21 File(s)     328704 bytes free
```

PLACE.XXX

```
REM PROGRAM PLACE.XXX PRODUCT 1
REM A PLACE HOLDER AND LOCATION MARKER FILE
```

INSTALL.BAT

```
ECHO OFF
REM INSTALL.BAT PRODUCT 1
ECHO INSTALL PROGRAM IN OPERATION - PLEASE WAIT
WAIT 2
IF EXIST TRANSFER.EXE GOTO CONTINUE
ECHO FORMAT-GARD ALREADY INSTALLED
GOTO ENDP
WAIT 2
:CONTINUE
CLS
ECHO ********************************************************************
ECHO **                                                                **
ECHO **                         FORMAT-GARD                            **
ECHO ** This program is protected under the United States copyright laws **
ECHO ** as an unpublished work, and is confidential and proprietary to **
ECHO ** Boyd W. Ghering. Its use or disclosure in whole or in part without **
ECHO  the express permission of Boyd W. Ghering is prohibited.       
ECHO ** @Copyright 1988, 1989 by Boyd W. Ghering. All rights reserved. **
ECHO                                                                 
ECHO **                          WARNING                               **
ECHO ** This product is uncopiable. Attempts to make a copy may result in **
ECHO  electromagnetic damage to your computer in which event all     
ECHO  warranties, express or implied, are null and void.             
ECHO ********************************************************************
ECHO PRESS CTRL-C TO ABORT - ANY OTHER KEY TO CONTINUE
PAUSE
ISTART
:ENDP
```

ICOND2.BAT

```
ECHO OFF
REM PROGRAM ICOND2.BAT PRODUCT1
COPY TRANSFER.EXE C:\
COPY PLACE.XXX C:\PLACE.EXE
ERASE TRANSFER.EXE
C:
CD\
COPY FORMAT.EXE %DRIVE%FORMAT.XXX
ERASE FORMAT.EXE
REN TRANSFER.EXE FORMAT.BAT
ECHO FORMAT-GARD INSTALLED
ECHO FORMAT COMMAND LOCKED
%DRIVE%
```

ICOND3.BAT

```
ECHO OFF
REM PROGRAM ICOND3.BAT PRODUCT 1
COPY TRANSFER.EXE C:\DOS
COPY PLACE.XXX C:\DOS\PLACE.COM
ERASE TRANSFER.EXE
C:
CD\DOS
COPY FORMAT.COM %DRIVE%FORMAT.XXX
ERASE FORMAT.COM
REN TRANSFER.EXE FORMAT.BAT
ECHO FORMAT-GARD INSTALLED
ECHO FORMAT COMMAND LOCKED
%DRIVE%
```

ICOND4.BAT

```
ECHO OFF
REM PROGRAM ICOND4.BAT PRODUCT 1
COPY TRANSFER.EXE C:\DOS
COPY PLACE.XXX C:\DOS\PLACE.EXE
ERASE TRANSFER.EXE
C:
CD\DOS
COPY FORMAT.EXE %DRIVE%FORMAT.XXX
ERASE FORMAT.EXE
REN TRANSFER.EXE FORMAT.BAT
ECHO FORMAT-GARD INSTALLED
ECHO FORMAT COMMAND LOCKED
%DRIVE%
```

TRANSFER.EXE

```
ECHO OFF
REM PROGRAM TRANSFER.EXE - FORMAT.BAT PRODUCT 1
CLS
ECHO *******************************
ECHO FORMAT-GARD PROTECTION MUST BE
ECHO REMOVED IN ORDER TO FORMAT DISK
ECHO MEDIA
ECHO *******************************
```

REMOVE.BAT

```
ECHO OFF
REM PROGRAM REMOVE.BAT PRODUCT 1
IF EXIST TRANSFER.EXE GOTO END
ECHO FORMAT-GARD REMOVAL IN PROGRESS - PLEASE WAIT
RSTART
:END
ECHO FORMAT-GARD NOT INSTALLED
ECHO PROGRAM ABORTED
```

RSTART.BAT

```
ECHO OFF
REM PROGRAM RSTART.BAT PRODUCT 1
REC C:\PLACE.COM RCOND1 C:\PLACE.EXE RCOND2 C:\DOS\PLACE.COM
RCOND3 C:\DOS\PLACE.EXE RCOND4
```

REC.BAT

```
ECHO OFF
REM PROGRAM REC.BAT PRODUCT 1
FLOPPY.COM
IF ERRORLEVEL 2 SET DRIVE=REM
IF ERRORLEVEL 2 ECHO NO EXTERNAL DRIVE SELECTED - PROGRAM ABORTED
IF ERRORLEVEL 2 GOTO END
IF ERRORLEVEL 0 IF NOT ERRORLEVEL 1 SET DRIVE=A:
IF ERRORLEVEL 1 SET DRIVE=B:
LOOP /S
:TOP
IF EXIST %1 %2
SHIFT
SHIFT
LOOP
IF NOT ERRORLEVEL 4 GOTO TOP
ECHO CANNOT LOCATE FORMAT PROGRAM
ECHO REMOVAL OF FORMAT-GARD ABORTED
%DRIVE%
```

RCOND1.BAT

```
ECHO OFF
REM PROGRAM RCOND1.BAT PRODUCT 1
COPY C:\FORMAT.BAT %DRIVE%TRANSFER.EXE
ERASE C:\FORMAT.BAT
ERASE C:\PLACE.COM
COPY %DRIVE%FORMAT.XXX C:\FORMAT.COM
ECHO FORMAT-GARD REMOVED
```

RCOND2.BAT

```
ECHO OFF
REM PROGRAM RCOND2.BAT PRODUCT 1
COPY C:\FORMAT.BAT %DRIVE%TRANSFER.EXE
ERASE C:\FORMAT.BAT
ERASE C:\PLACE.EXE
COPY %DRIVE%FORMAT.XXX C:\FORMAT.EXE
ECHO FORMAT-GARD REMOVED
```

RCOND3.BAT

```
ECHO OFF
REM PROGRAM RCOND3.BAT PRODUCT 1
COPY C:\DOS\FORMAT.BAT %DRIVE%TRANSFER.EXE
ERASE C:\DOS\FORMAT.BAT
ERASE C:\DOS\PLACE.COM
COPY %DRIVE%FORMAT.XXX C:\DOS\FORMAT.COM
ECHO FORMAT-GARD REMOVED
```

RCOND4.BAT

```
ECHO OFF
REM PROGRAM RCOND4.BAT PRODUCT 1
COPY C:\DOS\FORMAT.BAT %DRIVE%TRANSFER.EXE
ERASE C:\DOS\FORMAT.BAT
ERASE C:\DOS\PLACE.EXE
COPY %DRIVE%FORMAT.XXX C:\DOS\FORMAT.EXE
ECHO FORMAT-GARD REMOVED
```

APPENDIX B

FLOPPY.COM ROUTINE

```
U 0100
1DD1:0100 B419        MOV     AH,19
1DD1:0102 CD21        INT     21
1DD1:0104 3C00        CMP     AL,00
1DD1:0106 7406        JZ      010E
1DD1:0108 3C01        CMP     AL,01
1DD1:010A 7402        JZ      010E
1DD1:010C B0FF        MOV     AL,FF
1DD1:010E B44C        MOV     AH,4C
1DD1:0110 CD21        INT     21
```

APPENDIX C

CONDITIONAL INHIBITION

DIR

```
Volume in drive A has no label
Directory of A:\

LOOP        COM      69    6-01-88   12:00p
HIDE        COM     106    6-01-88   12:00p
UNHIDE      COM      75    6-01-88   12:00p
TRANSFER    EXE    1024    2-07-89   10:49p
READ        ME     3072    2-08-89   11:26p
PLACE       XXX     128    2-02-89   10:05a
ASK         COM     123    6-01-88   12:00p
ICOND1      BAT     384    2-08-89    9:42p
ASK2        COM     123    2-07-89    2:57p
ICOND2      BAT     384    2-08-89    9:43p
ICOND3      BAT     384    2-08-89    9:43p
ICOND4      BAT     384    2-08-89    9:43p
RCOND1      BAT     256    2-08-89    9:44p
REMOVE      BAT     256    2-07-89    9:33p
REC         BAT     512    2-07-89    9:34p
FLOPPY      COM      18   12-07-88    9:37p
WAIT        COM     121    6-01-88   12:00p
RCOND2      BAT     256    2-08-89    9:44p
INSTALL     BAT    1408    2-07-89   10:44p
RCOND3      BAT     256    2-08-89    9:45p
INS         BAT     512    2-07-89   10:45p
RSTART      BAT     128    2-07-89    9:26p
RCOND4      BAT     256    2-08-89    9:45p
ISTART      BAT     128    2-07-89   10:47p
       24 File(s)    334848 bytes free
```

PLACE.XXX

```
REM PROGRAM PLACE.XXX PRODUCT 2
REM A PLACE HOLDER AND LOCATION MARKER FILE
```

INSTALL.BAT

```
ECHO OFF
REM INSTALL.BAT PRODUCT 2
ECHO INSTALL PROGRAM IN OPERATION - PLEASE WAIT
WAIT 2
IF EXIST TRANSFER.EXE GOTO CONTINUE
ECHO FORMAT-GARD ALREADY INSTALLED
GOTO ENDP
WAIT 2
:CONTINUE
CLS
ECHO ******************************************************************
ECHO **                         FORMAT-GARD                          **
ECHO ** This program is protected under the United States copyright laws **
ECHO ** as an unpublished work, and is confidential and proprietary to **
ECHO ** Boyd W. Ghering. Its use or disclosure in whole or in part without **
ECHO  the express permission of Boyd W. Ghering is prohibited.     
ECHO ** @Copyright 1988, 1989 by Boyd W. Ghering. All rights reserved. **
ECHO                                                               
ECHO **                           WARNING                            **
ECHO ** This product is uncopiable. Attempts to make a copy may result in **
ECHO  electromagnetic damage to your computer in which event all   
ECHO  warranties, express or implied, are null and void.           
ECHO ******************************************************************
ECHO PRESS CTRL-C TO ABORT - ANY OTHER KEY TO CONTINUE
PAUSE
ISTART
:ENDP
```

PLACE.XXX

```
REM PROGRAM PLACE.XXX PRODUCT 2
REM A PLACE HOLDER AND LOCATION MARKER FILE
```

INSTALL.BAT

```
ECHO OFF
REM INSTALL.BAT
ECHO INSTALL PROGRAM IN OPERATION - PLEASE WAIT
WAIT 2
IF EXIST TRANSFER.EXE GOTO CONTINUE
ECHO FORMAT-GARD ALREADY INSTALLED
GOTO ENDP
WAIT 2
:CONTINUE
CLS
ECHO ***************************************************************
ECHO **                                                             **
ECHO **                       FORMAT-GARD                           **
ECHO ** This program is protected under the United States copyright laws **
ECHO ** as an unpublished work, and is confidential and proprietary to **
ECHO ** Boyd W. Ghering. Its use or disclosure in whole or in part without **
ECHO  the express permission of Boyd W. Ghering is prohibited.    
ECHO **      @Copyright 1988 by Boyd W. Ghering. All rights reserved. **
ECHO **                                                             **
ECHO **                         WARNING                             **
ECHO **    This product is uncopiable. Attempts to make a copy may  **
ECHO **   result in electromagnetic damage to your computer in which **
ECHO **   event all warranties, express or implied, are null and void. **
ECHO ***************************************************************
ECHO PRESS CTRL-C TO ABORT - ANY OTHER KEY TO CONTINUE
PAUSE
ISTART
:ENDP
```

ISTART.BAT

```
ECHO OFF
REM ISTART.BAT
INS C:\FORMAT.COM ICOND1 C:\FORMAT.EXE ICOND2 C:\DOS\FORMAT.COM
ICOND3 C:\DOS\FORMAT.EXE ICOND4
```

INS.BAT

```
ECHO OFF
REM INS.BAT
FLOPPY.COM
IF ERRORLEVEL 2 SET DRIVE=REM
IF ERRORLEVEL 2 ECHO NO EXTERNAL DRIVE SELECTED - PROGRAM ABORTED
IF ERRORLEVEL 2 GOTO END
IF ERRORLEVEL 0 IF NOT ERRORLEVEL 1 SET DRIVE=A:
IF ERRORLEVEL 1 SET DRIVE=B:
LOOP /S
:TOP
IF EXIST %1 %2
SHIFT
SHIFT
LOOP
IF NOT ERRORLEVEL 4 GOTO TOP
ECHO.CANNOT LOCATE FORMAT PROGRAM
ECHO INSTALLATION OF FORMAT-GARD ABORTED
%DRIVE%
```

ICOND1.BAT

```
ECHO OFF
REM ICOND1.BAT
COPY TRANSFER.EXE C:\
COPY ASK.COM C:\
COPY ASK2.COM C:\
COPY PLACE.XXX C:\PLACE.COM
ERASE TRANSFER.EXE
C:
CD\
REN FORMAT.COM XCEL.COM
REN TRANSFER.EXE FORMAT.BAT
%DRIVE%
HIDE C:\XCEL.COM
ECHO FORMAT-GARD INSTALLED
ECHO FORMAT COMMAND RESTRICTED
ECHO END OF PROGRAM
```

ICOND2.BAT

```
ECHO OFF
REM ICOND2.BAT
COPY TRANSFER.EXE C:\
COPY ASK.COM C:\
COPY ASK2.COM C:\
COPY PLACE.XXX C:\PLACE.EXE
ERASE TRANSFER.EXE
C:
CD\
REN FORMAT.EXE XCEL.EXE
REN TRANSFER.EXE FORMAT.BAT
%DRIVE%
HIDE C:\XCEL.EXE
ECHO FORMAT-GARD INSTALLED
ECHO FORMAT COMMAND RESTRICTED
ECHO END OF PROGRAM
```

ICOND3.BAT

```
ECHO OFF
REM ICOND3.BAT
COPY TRANSFER.EXE C:\DOS
COPY ASK.COM C:\DOS
COPY ASK2.COM C:\DOS
COPY PLACE.XXX C:\DOS\PLACE.COM
ERASE TRANSFER.EXE
C:
CD\DOS
REN FORMAT.COM XCEL.COM
REN TRANSFER.EXE FORMAT.BAT
%DRIVE%
HIDE C:\DOS\XCEL.COM
ECHO FORMAT-GARD INSTALLED
ECHO FORMAT COMMAND RESTRICTED
ECHO END OF PROGRAM
```

ICOND4.BAT

```
ECHO OFF
REM ICOND4.BAT
COPY TRANSFER.EXE C:\DOS
COPY ASK.COM C:\DOS
COPY ASK2.COM C:\DOS
COPY PLACE.XXX C:\DOS\PLACE.EXE
ERASE TRANSFER.EXE
```

```
C:
CD\DOS
REN FORMAT.EXE XCEL.EXE
REN TRANSFER.EXE FORMAT.BAT
%DRIVE%
HIDE C:\DOS\XCEL.EXE
ECHO FORMAT-GARD INSTALLED
ECHO FORMAT COMMAND RESTRICTED
ECHO END OF PROGRAM
```

TRANSFER.EXE

```
ECHO OFF
REM TRANSFER.EXE
:BADCHAR
ASK WISH TO FORMAT EXTERNAL DRIVE (Y/N)?
IF ERRORLEVEL == 90 GOTO BADCHAR
IF ERRORLEVEL == 89 GOTO RUNCHK
IF ERRORLEVEL == 79 GOTO BADCHAR
IF ERRORLEVEL == 78 GOTO GOODCHAR
GOTO BADCHAR
:GOODCHAR
CLS
ECHO ******************************
ECHO FORMAT-GARD PROTECTION MUST BE
ECHO REMOVED IN ORDER TO FORMAT HARD
ECHO DISK MEDIA
ECHO ******************************
GOTO END2
:RUNCHK
:TOP
CLS
ECHO ******************************
ECHO     1 -- FORMAT DRIVE A:
ECHO     2 -- FORMAT DRIVE B:
ECHO     3 -- QUIT
ECHO ******************************
ASK2 ENTER A NUMBER FROM 1 TO 3
IF ERRORLEVEL 51 GOTO GOODCHAR
IF ERRORLEVEL 50 IF NOT ERRORLEVEL 51 GOTO BDR
IF ERRORLEVEL 49 IF NOT ERRORLEVEL 50 GOTO ADR
GOTO END2
:BDR
SET DRIVE=B:
ECHO DRIVE B HAS BEEN SELECTED
GOTO CONTINUE
:ADR
SET DRIVE=A:
ECHO DRIVE A HAS BEEN SELECTED
:CONTINUE
XCEL %DRIVE%
:END2
ECHO END OF PROGRAM
```

REMOVE.BAT

```
ECHO OFF
REM REMOVE.BAT
IF EXIST TRANSFER.EXE GOTO END
ECHO FORMAT-GARD REMOVAL IN PROGRESS - PLEASE WAIT
RSTART
:END
ECHO FORMAT-GARD NOT INSTALLED
ECHO PROGRAM ABORTED
```

RSTART.BAT

```
ECHO OFF
REM RSTART.BAT
REC C:\PLACE.COM RCOND1 C:\PLACE.EXE RCOND2 C:\DOS\PLACE.COM
RCOND3 C:\DOS\PLACE.EXE RCOND4
```

REC.BAT

```
ECHO OFF
REM REC.BAT
FLOPPY.COM
IF ERRORLEVEL 2 SET DRIVE=REM
IF ERRORLEVEL 2 ECHO NO EXTERNAL DRIVE SELECTED - PROGRAM ABORTED
IF ERRORLEVEL 2 GOTO END
IF ERRORLEVEL 0 IF NOT ERRORLEVEL 1 SET DRIVE=A:
IF ERRORLEVEL 1 SET DRIVE=B:
LOOP /S
:TOP
IF EXIST %1 %2
SHIFT
SHIFT
LOOP
IF NOT ERRORLEVEL 4 GOTO TOP
ECHO CANNOT LOCATE FORMAT PROGRAM
ECHO REMOVAL OF FORMAT-GARD ABORTED
%DRIVE%
```

RCOND1.BAT

```
ECHO OFF
REM RCOND1.BAT
UNHIDE C:\XCEL.COM
C:
CD\
COPY FORMAT.BAT %DRIVE%TRANSFER.EXE
ERASE FORMAT.BAT
ERASE ASK.COM
ERASE ASK2.COM
ERASE PLACE.COM
REN XCEL.COM FORMAT.COM
ECHO FORMAT-GARD REMOVED
%DRIVE%
ECHO END OF PROGRAM
```

RCOND2.BAT

```
ECHO OFF
REM RCOND2.BAT
UNHIDE C:\XCEL.EXE
C:
CD\
COPY FORMAT.BAT %DRIVE%TRANSFER.EXE
ERASE FORMAT.BAT
ERASE ASK.COM
ERASE ASK2.COM
ERASE PLACE.EXE
REN XCEL.EXE FORMAT.EXE
ECHO FORMAT-GARD REMOVED
%DRIVE%
ECHO END OF PROGRAM
```

RCOND3.BAT

```
ECHO OFF
REM RCOND3.BAT
UNHIDE C:\DOS\XCEL.COM
```

```
C:
CD\DOS
COPY FORMAT.BAT %DRIVE%TRANSFER.EXE
ERASE FORMAT.BAT
ERASE ASK.COM
ERASE ASK2.COM
ERASE PLACE.COM
REN XCEL.COM FORMAT.COM
ECHO FORMAT-GARD REMOVED
%DRIVE%
ECHO END OF PROGRAM
```

RCOND4.BAT

```
ECHO OFF
REM RCOND4.BAT
UNHIDE C:\DOS\XCEL.EXE
C:
CD\DOS
COPY FORMAT.BAT %DRIVE%TRANSFER.EXE
ERASE FORMAT.BAT
ERASE ASK.COM
ERASE ASK2.COM
ERASE PLACE.EXE
REN XCEL.EXE FORMAT.EXE
ECHO FORMAT-GARD REMOVED
%DRIVE%
ECHO END OF PROGRAM
```

I claim:

1. A method for inhibiting an executable formatting file in a disk operating system installed on a hard disk of a computer having at least one external drive, comprising the steps of:
   inserting into an external drive a distribution disk including an ineffective substitute file;
   copying the formatting file from the hard disk to the distribution disk and removing it from the hard disk;
   copying the substitute file from the distribution disk to the hard disk;
   renaming the substitute file on the hard disk with the same filename as the removed executable file and an executable extension; and
   removing the distribution disk containing the copied formatting file from the external drive.

2. A method according to claim 1 including the steps of:
   specifying paths in the disk operating system to be searched for the formatting file; and
   iteratively searching the specified paths for the executable file.

3. A method according to claim 1 further comprising:
   reinserting the distribution disk containing the removed formatting file into the external drive;
   copying the formatting file to the hard disk in the computer; and
   copying the substitute file to the distribution disk.

4. A method according to claim 1 further comprising the steps of:
   executing the substitute file when an attempt is made to execute said executable file;
   displaying a program failure message when the substitute file is executed.

5. A method according to claim 1 further comprising the step of:
   renaming the removed formatting file on the distribution disk with an unexecutable file extension.

6. A method according to claim 5 further comprising:
   specifying paths in the distribution disk to be searched for the renamed formatting file; and
   iteratively searching the specified paths for the renamed formatting file.

7. In a computer disk operating system installed on a hard disk of a computer having at least one external drive, a method for preventing use of an executable file in the computer, comprising the steps of:
   inserting a distribution disk into said external drive;
   copying to the hard disk an ineffective substitute file contained in said distribution disk;
   causing the computer to search specified paths in the hard disk for the executable file;
   copying to the distribution disk the executable file found in the search and removing said executable file from the hard disk;
   causing the computer to rename the extension of the copied executable file for inhibiting execution thereof; and
   causing the computer to rename the substitute file on the hard disk with the same filename as the executable file and an extension executable by the disk operating system.

8. A method according to claim 7 wherein said executable file comprises a formatting program.

* * * * *